(12) United States Patent
Link et al.

(10) Patent No.: US 6,324,949 B1
(45) Date of Patent: Dec. 4, 2001

(54) MACHINE TOOL

(75) Inventors: Helmut Friedrich Link, Aichwald; Guenther Heinrich Trautmann, Kirchheim/Nabern, both of (DE)

(73) Assignee: Index-Werke GmbH & Co. KG Hahn & Tessky, Esslingen (DE)

( * ) Notice: Subject to any disclaimer, the term of this patent is extended or adjusted under 35 U.S.C. 154(b) by 0 days.

(21) Appl. No.: 09/493,890

(22) Filed: Jan. 28, 2000

(30) Foreign Application Priority Data

Feb. 3, 1999 (DE) .............................................. 199 04 253

(51) Int. Cl.⁷ .................................. B23B 1/00; B23B 9/00
(52) U.S. Cl. ................................ 82/1.11; 82/1.3; 82/118; 82/129
(58) Field of Search .......................... 82/1.11, 118, 129, 82/1.2, 1.4, 1.5, 12, 86, 133, 1.3

(56) References Cited

U.S. PATENT DOCUMENTS

| | | | |
|---|---|---|---|
| 2,661,640 | * 12/1953 | Ruegg | 82/1.3 |
| 3,364,788 | * 1/1968 | Schubert | 74/665 GA |
| 3,966,347 | * 6/1976 | Watson | 408/180 |
| 3,981,056 | 9/1976 | Gilbert et al. . | |
| 4,635,340 | 1/1987 | Link . | |
| 4,651,599 | * 3/1987 | Ley | 82/1.3 X |
| 5,076,744 | * 12/1991 | Kitagawa et al. | 409/66 |
| 5,396,821 | * 3/1995 | Okurmura et al. | 82/1.3 |
| 5,419,223 | 5/1995 | Kubler et al. . | |
| 5,697,270 | 12/1997 | Link . | |
| 5,842,392 | * 12/1998 | Pfeifer et al. | 82/1.11 |

FOREIGN PATENT DOCUMENTS

| | | |
|---|---|---|
| 32 34 121 | 3/1984 | (DE) . |
| 196 49 016 | 5/1998 | (DE) . |
| 0 433 722 | 6/1991 | (EP) . |

* cited by examiner

*Primary Examiner*—Henry Tasi
(74) *Attorney, Agent, or Firm*—Barry R. Lipsitz

(57) ABSTRACT

The invention relates to a machine tool comprising a machine frame and at least one workpiece spindle. A workpiece can be clamped in the workpiece spindle and driven for rotation about a workpiece spindle axis into defined rotary positions by means of a numerically controlled C-axis. A support is provided on which the workpiece spindle is arranged and with which the workpiece spindle can be moved relative to the machine frame and transversely to the workpiece spindle axis into at least two spindle stations stationarily arranged with respect to the machine frame. At least one tool carrier associated with a selected one of the spindle stations is provided, which comprises a transverse-slide carrier mounted on the machine frame and having a transverse slide for a tool movable in an X direction relative to the workpiece spindle located in the selected spindle station. The transverse-slide carrier is pivotable in relation to the machine frame about a pivot axis parallel to the workpiece spindle axis by means of a pivot drive in a numerically controlled manner.

37 Claims, 10 Drawing Sheets

MACHINE TOOL

The present disclosure relates to the subject matter disclosed in German Application No. 199 04 253.5 of Application No. 09/493,890 Feb. 3, 1999, the entire specification of which is incorporated herein by reference.

BACKGROUND OF THE INVENTION

The invention relates to a machine tool comprising a machine frame, at least one workpiece spindle, in which a workpiece can be clamped and driven for rotation about a workpiece spindle axis, a support, on which the workpiece spindle is arranged and with which the workpiece spindle can be moved relative to the machine frame and transversely to the workpiece spindle axis into at least two spindle stations stationarily defined with respect to the machine frame, and at least one tool carrier associated with a selected one of the spindle stations, comprising a cross-slide carrier (also referred to herein as a "transverse-slide carrier") mounted on the machine frame and having a cross slide (also referred to herein as a "transversed slide") for a tool movable in an X direction relative to the workpiece spindle located in the selected spindle station.

A machine tool of this type is known, for example, from DE-A-196 49 016.

In a machine tool of this type, the tool carriers are designed such that they are movable in the direction of an X-axis stationarily defined with respect to the machine frame and, where applicable, of a Z-axis.

As a result, the tool carriers are merely suitable for the use of stationary tools for classic rotary machining or also for the use of rotatingly driven tools, with which, however, only a center machining of the workpieces is possible.

DE-B-33 28 327 discloses, in addition, a possibility, with which an off-center machining of a workpiece is also possible by means of a turret movable in an X-axis.

SUMMARY OF THE INVENTION

Proceeding on the basis of DE 196 49 016, the object underlying the invention is to improve a machine tool of the generic type in such a manner that with a construction which is space-saving in the area of the cross slide a center and off-center machining of the workpiece is possible by means of a rotating tool.

This object is accomplished in accordance with the invention, in a machine tool of the type described at the outset, in that the workpiece held in the workpiece spindle is rotatable about the workpiece spindle axis into defined rotary positions by means of a numerically controlled C-axis, that the cross-slide carrier is pivotable in relation to the machine frame about a pivot axis parallel to the workpiece spindle axis of the workpiece spindle located in the selected spindle station by means of a pivot drive in a numerically controlled manner, that a tool spindle is provided on the cross slide for receiving a tool drivable for rotation about a tool spindle axis and that the tool spindle axis forms with the X direction an angle of less than 45°.

It is possible with the inventive solution to carry out center and off-center machinings of the workpiece with an extremely space-saving mode of construction in the area of the cross slide and without an additional linear axis extending at right angles to the X direction for moving the tool.

In this respect, an off-center machining of the workpiece is understood in the inventive sense as any machining, with which the tool spindle axis does not intersect the workpiece spindle axis but extends at a distance from it.

Furthermore, the X direction is designated in the sense of the present invention as any direction which extends parallel to a direction extending transversely to the pivot axis and preferably in the direction of the workpiece spindle in the selected spindle station.

In principle, the machine control of the inventive solution could coordinate the pivoting of the cross-slide carrier and the pivoting of the workpiece in any optional manner, wherein the only limiting condition is that the tool must be aligned relative to the workpiece such that cutting edges of the tool move on a flight path suitable for chip removal during the relative movement between workpiece and tool.

It is particularly advantageous when the tool spindle axis extends in all the positions of the cross slide in a plane extending at right angles to the workpiece spindle axis of the workpiece spindle located in the selected spindle station.

Since rotating tools for machine tools are preferably designed such that their cutting edges provide an optimum cutting result during movement relative to the workpiece at right angles to the tool spindle axis or in the direction of the tool spindle axis, it is preferably provided for a machine control to be provided, with which in a Y-axis simulation mode the workpiece is movable about the workpiece spindle axis and the cross slide carrier is movable about the pivot axis simultaneously in such a manner that in all the off-center positions of the tool spindle axis provided for the off-center machining of the workpiece by the driven tool the tool spindle axis always extends at right angles to a virtual Y-axis arranged so as to be stationary relative to the workpiece and located in a virtual plane extending through the workpiece spindle axis.

With such a Y-axis simulation mode of the machine control, a movement of the rotating tool relative to the workpiece may be advantageously generated which corresponds to the movements which can be achieved with a conventional Y-axis movement of the tool relative to the workpiece, wherein the simulated, virtual Y-axis is located in the virtual plane and extends radially to the workpiece spindle axis.

In order to be able to machine exact plane surfaces which extend, in particular, parallel to the workpiece spindle axis it is provided for the tool spindle axis to always be at right angles to the virtual plane.

A particularly favorable design of this solution provides for the machine control, in the Y-axis simulation mode, to control the X-axis in addition to the C-axis and to the pivot axis in such a manner that a surface area defined by the entirety of all the rotatingly moved cutting edges of the rotatingly driven tool always moves in a constant alignment to a constant distance from the virtual plane in all the off-center positions of the tool spindle axis. This variation of the Y-axis simulation mode has the great advantage that with it plane surfaces can be generated on the workpiece which extend transversely to the X-axis without a linear axis for the movement of the rotating tool in Y direction being necessary.

One alternative variation provides for the machine control, in the Y-axis simulation mode and in a specific off-center position of the tool spindle axis, to maintain the Y value of the simulated Y-axis determining this position and while this position is being maintained to move the tool linearly at right angles to the virtual plane by controlling the X-axis and, where applicable, the C-axis and the pivot axis. With this variation of the inventive Y-axis simulation mode, a bore may, in particular, be introduced into a workpiece or notches inserted in the known manner off-center.

With respect to the arrangement of the tool spindle axis relative to the X-axis, it has merely be ascertained so far that these form with one another an angle of less than 45°, wherein the angle is preferably intended to be as small as possible.

It has proven to be particularly favorable when the tool spindle axis extends parallel to the X-axis so that particularly during the off-center machining, during which a movement of the rotating tool is intended to take place in the direction of the tool spindle axis, this movement can be controlled in a simple manner in that no rotations about the C-axis and the pivot axis are required when a movement takes place along the X-axis since only a movement of the cross slide in the direction of the X-axis is necessary for the movement of the tool spindle axis parallel to its axial direction.

With respect to the mounting of the cross-slide carrier on the machine frame, the most varied of solutions are conceivable. For example, it would be conceivable to position the cross-slide carrier relative to the machine frame by means of a support element arranged between it and the machine frame.

It is, however, particularly favorable when the cross-slide carrier is rotatable about a pivot bearing securely arranged on the machine frame and determining the pivot axis since, as a result, a constructional solution is available which is, on the tone hand, simple but, on the other hand, also represents a high precision with respect to the pivotable guidance of the cross-slide carrier relative to the machine frame.

For reasons of as space-saving a solution as possible in the working area it is preferably provided for a motor for the pivot drive to be located on a side of the machine frame, in particular of the upright thereof supporting the carrier, remote from the working area.

In order to be able to pivot the cross-slide carrier, it would, for example, be conceivable to act on the cross-slide carrier via a shaft extending coaxially to the pivot axis. It has, however, proven to be particularly favorable when the cross-slide carrier is connected to a pivot drive arm which extends radially to the pivot axis and on which the pivot drive acts. Such a solution has the advantage that with it and using the principles of leverage a very exact pivoting of the cross-slide carrier can be brought about, on the one hand, and, on the other hand, considerable moments acting on the pivot axis can be absorbed with constructionally simple means so that this solution offers itself, in particular, with respect to the desired precision.

In order to be able to move the pivot drive arm in a simple manner, it is preferably provided for the pivot drive to act on the pivot drive arm via a turning gear. Such a turning gear can thereby be designed in the most varied of ways. For example, this may be a gearing like a gear wheel or, however, a lever gear or a gear acting on the pivot drive arm with pull elements.

It is, however, advantageous with respect to a precise pivoting of the cross-slide carrier when the turning gear is designed to have little play, preferably to be essentially free from play.

A further embodiment provides for the turning gear to comprise a toothed element which is rotatable about an axis parallel to the pivot axis and acts on teeth of the pivot drive arm.

Within the scope of the explanations concerning the preceding embodiments it has merely been assumed that the cross-slide carrier is intended to be pivotable about the pivot axis.

It is, in particular, possible with the inventive solution to bring about a Z movement by displacing the workpiece spindles relative to the carrier in the direction of the workpiece spindle axis and thus in the Z direction.

However, in order to make the flexibility during the machining of the workpieces as large as possible, one advantageous solution provides for the cross-slide carrier itself to be displaceable in Z direction relative to the machine frame. With this solution it is, in particular, possible for a machining of the workpiece to take place with several tools, and the relative movements between the rotatingly driven tool and the workpiece can thereby take place independently of the movements required for the machining of the workpiece with other tools in Z direction.

In order to realize this movement of the cross-slide carrier in Z direction, it is preferably provided for the cross-slide carrier to be mounted on the machine frame by means of a longitudinal guide element displaceable in the Z direction relative to the machine frame.

Such a longitudinal guide element could, for example, be a customary slide guide means. It is, however, particularly favorable when the longitudinal guide element is designed as a guide arm extending in the Z direction, this arm being mounted by guide means relative to the machine frame.

With respect to the mounting of the guide arm on the machine frame, the most varied of solutions are likewise conceivable. In principle, all the embodiments of such a machine frame can be used for the inventive solution. One particularly favorable solution does, however, provide for the guide arm to pass through an upright on the machine frame mounting the carrier, i.e., for the guide arm to extend, for example, through the upright away from the working area in order to have as much collision-free space as possible available in the working area. It is particularly favorable when the guide arm is, in addition, mounted on the upright mounting the carrier in such a manner that the penetration of the upright can be utilized at the same time advantageously for the mounting of the guide arm.

In this respect, it is preferably provided for the guide arm to be mounted in Z guide means held on the machine frame so as to be movable in the Z direction relative to the machine frame. In this respect, the guide arm can, for example, be designed such that it passes through the Z guide means so that a stable guidance of the guide arm on the machine frame is possible.

With respect to the combination of the pivot bearing for the cross-slide carrier and the guide arm, no further details have so far been given. One advantageous embodiment provides, for example, for the pivot bearing for the cross-slide carrier to support the guide arm and thus for the guide arm to already be pivotable by means of the pivot bearing.

For example, it would still be conceivable with this solution to design the pivot bearing and the Z guide means as two separate guide means. One particularly favorable solution, in particular, with respect to the spatial requirements provides for the pivot bearing to also form the Z-guide means for the guide arm so that the cross-slide carrier is mounted on the machine frame by a single guide means which, on the one hand, allows pivoting of the cross-slide carrier and, on the other hand, also a displacement thereof in the Z direction, due to displacement of the guide arm relative to the Z-guide means.

A particularly advantageous solution from a constructional point of view provides for the guide arm to be designed as a spindle sleeve member which is mounted in the pivot bearing for displacement in Z direction, wherein the spindle sleeve member is preferably designed such that a casing surface of the spindle sleeve member itself represents a bearing surface which is mounted for rotation in the pivot bearing and is displaceable in Z direction relative to the pivot bearing.

In conjunction with the preceding comments on the embodiments, it has merely been explained that the pivot drive arm is intended to be rigidly connected to the cross-slide carrier.

It has proven to be particularly favorable, in particular, with a solution with a guide arm when the pivot drive arm is non-rotatably connected to the guide arm and thus acts on the guide arm in order to pivot the cross-slide carrier. In this respect, it is still possible to design the pivot drive arm to be displaceable in Z direction relative to the guide arm. However, in order to achieve as great a precision as possible during the pivoting of the cross-slide carrier, it is preferably provided for the pivot drive arm to be rigidly connected to the guide arm.

Particularly with a pivot drive arm rigidly connected to the guide arm it is advantageous when the pivot drive arm is movable by means of a toothed element extending in a direction parallel to the pivot axis so that during a displacement of the cross-slide carrier in the Z direction the pivot drive arm slides on the toothed element in the longitudinal direction of it.

The toothed element is preferably designed such that it extends in the direction of the pivot axis with a length corresponding to a maximum path of displacement of the cross-slide carrier in Z direction.

With respect to the drive of the cross slide, the most varied of possibilities are conceivable.

It would, for example, be conceivable to drive the cross slide by means of a transverse feed drive seated on it.

It is, however, particularly favorable when the cross-slide carrier is provided with a transverse feed drive for the controlled movement of the cross slide in the X direction so that the transverse feed drive which requires an appreciable constructional space does not increase the spatial requirements in the area of the cross slide.

A solution, with which the transverse feed drive is arranged on a side of the longitudinal guide element located opposite the cross slide, is particularly favorable with respect to the spatial requirements. It is thus possible, in particular, to arrange the transverse feed drive, which requires space, on a side of the longitudinal guide element which is located opposite the working area and on which the spatial limitations existing in the working area of the machine tool are no longer present.

Furthermore, it is advantageous when the longitudinal feed drive is arranged on the machine frame in order not to load the cross-slide carrier with the longitudinal feed drive as well.

It is particularly favorable when the longitudinal feed drive is also arranged on a side of the machine frame facing away from the working area.

It is favorable, in particular, when the longitudinal feed drive is arranged on the upright receiving the support for the workpiece spindles on a side located opposite the working area.

With respect to the longitudinal drive acting on the cross-slide carrier, the most varied of solutions are conceivable. One advantageous variation provides for the longitudinal feed drive to act on a supporting arm which extends transversely to the longitudinal guide element and is connected to the longitudinal guide element so as to be non-displaceable in the Z direction.

This solution represents a simple constructional possibility for realizing a longitudinal feed for the longitudinal guide a element.

A particularly simple type of realization thereby provides for the longitudinal feed drive to act on the supporting arm via a longitudinal feed gear.

Such a longitudinal feed gear may preferably be arranged in the machine frame itself. A particularly favorable type of arrangement of such a longitudinal feed gear provides for this to be arranged in the upright which accommodates the support for the workpiece spindles.

Thus, with this realization, as well, the space required for the longitudinal feed drive is shifted into an area of the machine tool, i.e., in particular into an area of the machine upright, in which sufficient space is available in any case without the spatial requirements in the working area itself being impaired.

Particularly in order to obtain an exact displacement of the supporting arm in the Z direction it is preferably provided for the supporting arm to be held on the longitudinal guide element so as to be pivotable about the pivot axis and thus for the pivoting movements of the longitudinal guide element not to have any effect on the connection between the supporting arm and the longitudinal feed drive.

For the defined alignment of the supporting arm the supporting arm is preferably secured against any tilting about the pivot axis by a tilt support extending parallel to the direction of the pivot axis. Such a tilt support can be provided directly on the machine frame.

A particularly advantageous solution provides for the toothed element which is used for the pivoting of the cross-slide carrier to serve at the same time to form the tilt support.

Moreover, in order to be able to realize the Z movement of the cross-slide carrier, in addition, it is preferably provided for the supporting arm to be guided on the toothed element for displacement parallel to the direction of the pivot axis.

With respect to the design of the support for the workpiece spindles, no specific comments have been made. It would, for example, be conceivable to design the support for the workpiece spindles as a linearly movable support for the workpiece spindles in order to thus arrange the workpiece spindles between, for example, two or more spindle stations so as to be movable linearly on the machine frame.

One embodiment of the inventive machine tool particularly advantageous with respect to its capacity provides for the support to be designed as a spindle drum which is mounted on the machine frame so as to be pivotable about a drum axis and which supports a plurality of workpiece spindles which can be moved into individual spindle stations and thus into the selected spindle station, as well, due to rotation of the spindle drum about the drum axis.

The advantages of the inventive solution are particularly striking in the case of such a multispindle lathe, in particular, since with this machine spatial problems always exist with respect to the arrangement of the tool slides in the working area.

The spindle drum is preferably designed such that in it all the workpiece spindles are arranged with their workpiece spindle axes at equal angular distances around the drum axis and likewise the workpiece spindle axes preferably extend parallel to the drum axis.

In addition, the invention relates to a method for operating a machine tool with a machine frame, with at least one workpiece spindle, in which a workpiece is clamped and can be driven for rotation about a workpiece spindle axis, with a support, on which the workpiece spindle is arranged and with which the workpiece spindle can be moved relative to the machine frame and transversely to the workpiece spindle axis into at least two spindle stations stationarily defined with respect to the machine frame and with at least one tool carrier associated with a selected spindle station, comprising a cross-slide carrier mounted on the machine frame and having a cross slide for a tool which can be moved in an X direction in relation to the workpiece spindle located in the selected spindle station, which is characterized in accordance with the invention in that the workpiece held in the workpiece spindle is moved about the workpiece spindle axis into defined rotary positions by means of a numerically controlled C-axis, that the cross-slide carrier is moved in relation to the machine frame about a pivot axis parallel to the workpiece spindle axis of the workpiece spindle located in the selected spindle station by means of a pivot drive in a numerically controlled manner, that a tool spindle is provided on the cross slide for receiving a tool driven for rotation about a tool spindle axis and that the tool spindle axis forms with the X direction an angle of less than 45° and, in addition, is moved in a plane extending at right angles to the workpiece spindle axis of the workpiece spindle located in the selected spindle station due to the movement of the cross slide in the X direction and about the pivot axis.

In addition, a further development of the inventive method provides for the workpiece, in a Y-axis simulation mode, to be moved about the workpiece spindle axis and the cross-slide carrier about the pivot axis simultaneously in such a manner that in all the off-center positions of the tool spindle axis provided for the off-center machining of the workpiece by the driven tool this axis is always at right angles to a virtual Y-axis arranged so as to be stationary relative to the workpiece and located in a virtual plane extending through the workpiece spindle axis, this axis being turned due to turning of the workpiece about the workpiece spindle axis.

With this solution it is possible, in the same way as that described in conjunction with the inventive machine tool, to always move the rotatingly driven tool in relation to the workpiece as if a true Y-axis were present for moving the tool relative to the workpiece.

A particularly favorable development of the inventive method for producing plane surfaces provides for the tool, in the Y-axis simulation mode, to be moved in the X-axis in addition to the C-axis and to the pivot axis in such a manner that a cutting edge of the rotatingly drive tool always moves at a constant distance from the virtual plane in all the center and off-center positions of the tool spindle axis.

Alternatively thereto, an advantageous embodiment of the inventive method provides that in the Y-axis simulation mode in a specific off-center position of the tool spindle axis the Y-value of the simulated Y-axis determining this position is maintained and while this position is being maintained the tool is moved linearly through the X-axis and, where applicable, through the C-axis and the pivot axis at right angles to the virtual plane. All the machinings are thus possible which represent, for example, boring or recessing work which can also be carried out with a true Y-axis for the movement of the workpiece.

Additional features and advantages of the inventive solution are the subject matter of the following description as well as the drawings illustrating several embodiments.

DETAILED DESCRIPTION OF THE INVENTION

Figure 1:
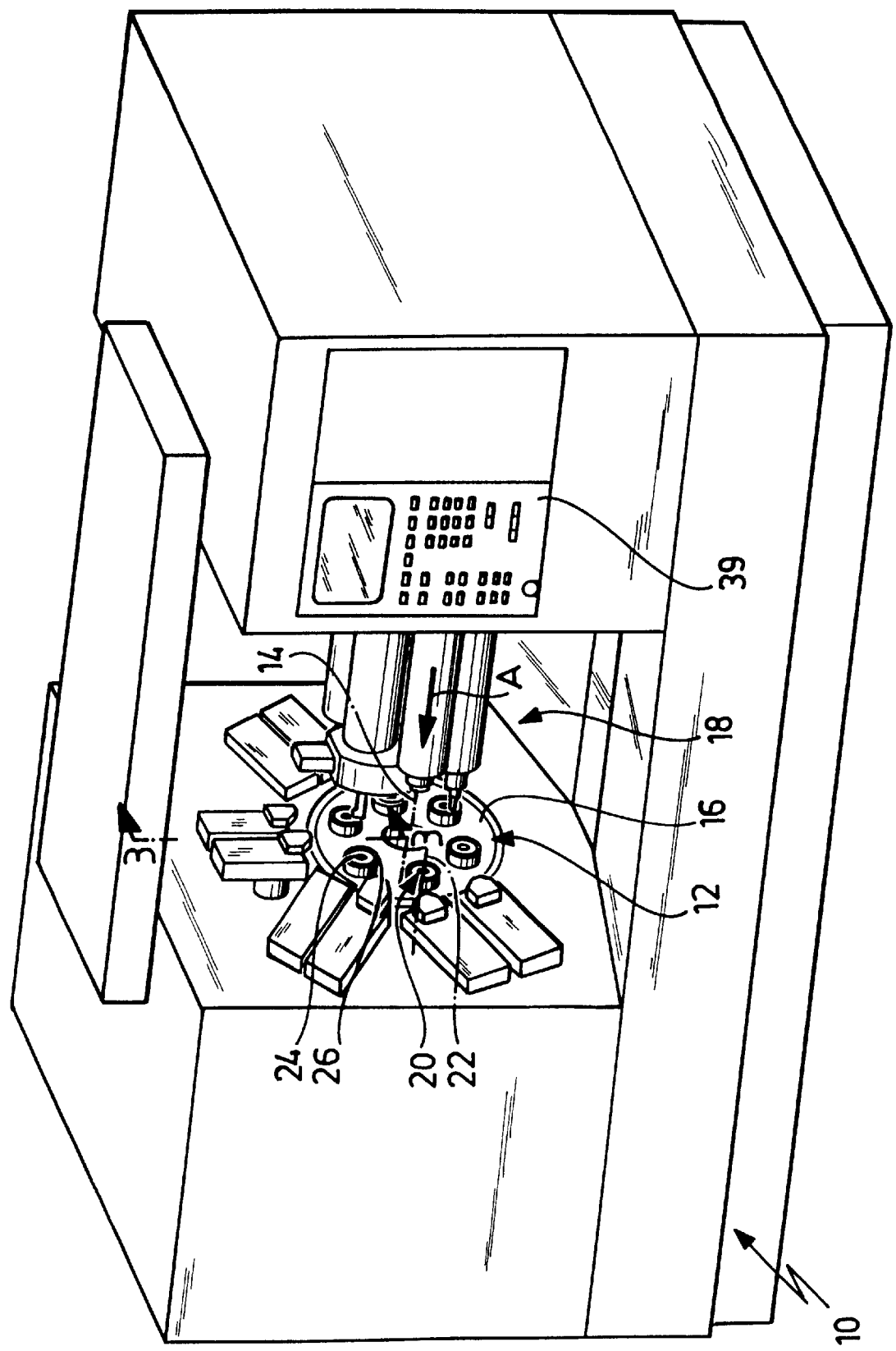
FIG. 1 shows a perspective illustration of one embodiment of an inventive lathe.

A first embodiment of an inventive multispindle lathe, illustrated in FIG. 1, has a machine frame which is designated as a whole as 10 and on which a spindle drum designated as a whole as 12 is mounted for rotation about a drum axis 14.

The spindle drum 12 is arranged with an end face 16 to face a working area designated as a whole as 18 and serves as carrier for a plurality of workpiece spindles 20 which are arranged at equal radial distances from the drum axis 14 and at equal angular distances around it and the workpiece spindle axis 22 of which extends, for example, parallel to the drum axis 14. The workpiece spindles 20 likewise face the working area 18 with their end face 24 and preferably support a workpiece clamping means for clamping a workpiece on their end faces. Furthermore, the workpiece spindles 20 are rotatable about the spindle axis 22 as C-axis into defined rotary positions in a numerically controlled manner.

Figure 2:
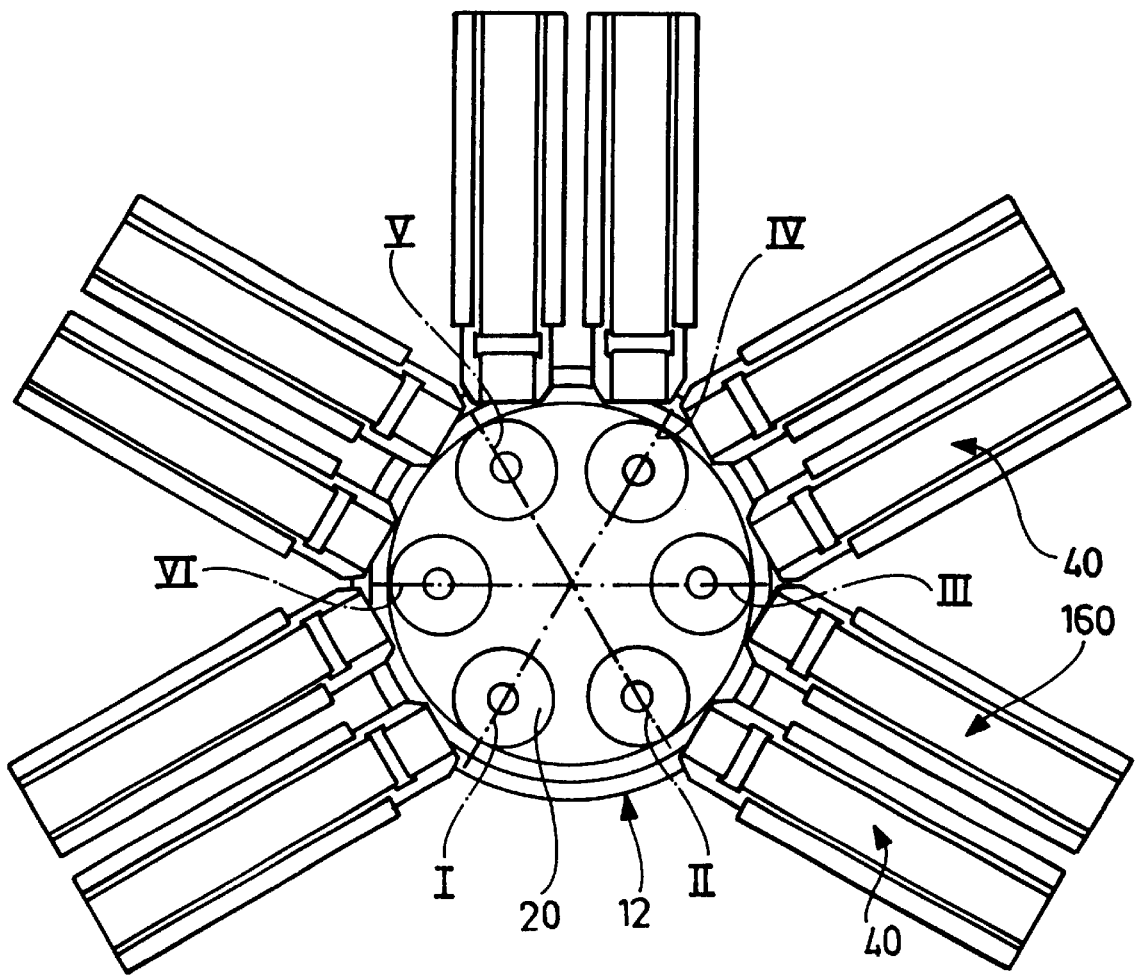
FIG. 2 shows a plan view of a spindle drum of the embodiment according to FIG. 1 in the direction of arrow A in FIG. 1.
Figure 3:
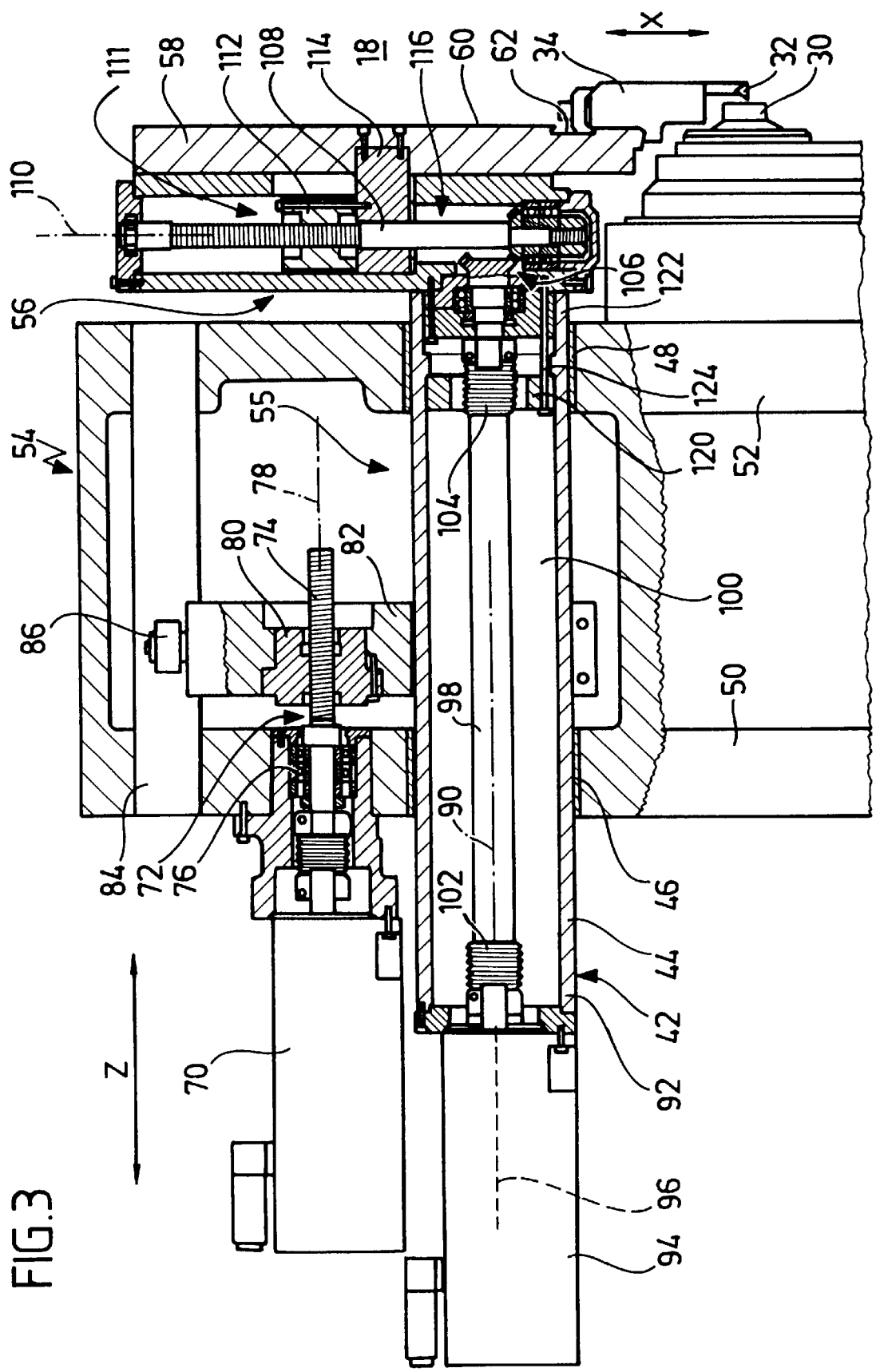
FIG. 3 shows a section along line 3—3 in FIG. 1 through a tool slide for stationary tools.

The spindle drum 12 is, as illustrated in FIG. 2, rotatable such that its workpiece spindles 20 can be positioned in different spindle stations I to VI relative to the machine frame 10. In these spindle stations I to VI, a workpiece 30 illustrated, for example, in FIG. 3 is machined by means of one or more tools 32 which are accommodated in tool holders 34. For the machining of the workpieces 30 the tools 32 are movable in a controlled manner at least in X direction by means of a machine control 39 illustrated in FIG. 1, a controlled movement of the tools 32 in Z direction preferably takes place in addition.

In order to be able to carry out as many machinings as possible with as many different tools as possible in the individual spindles stations IV to VI, two tool slides 40 equippable with stationary tools are allocated to each of the spindle stations IV to VI. These tool slides are arranged on the side of the working area 18, on which the spindle drum 12 is also arranged. Each of these tool slides 40 designed as compound slides comprises, as illustrated in FIG. 3, a longitudinal slide element 42 which is designed in the form of a spindle sleeve and is mounted with a housing tube 44 in two linear guide means 46 and 48 which are arranged at a distance from one another, form altogether a longitudinal guide means in Z direction and are arranged in two bearing brackets 50 and 52 of a slide upright 54 arranged at a distance from one another, the spindle drum 12 also being mounted in this upright.

The longitudinal guide element 42 designed as a spindle sleeve forms a cross-slide carrier 55 (transverse-slide carrier) and supports on its side facing the working area 18 a cross-slide guide means 56 which is likewise comprised by the cross-slide carrier 55 and on which a cross slide 58 (transverse slide) is arranged for displacement in X direction. The cross slide 58 supports a receiving means 62 for the tool holder 34 on its upper side 60 facing the working area.

The cross-slide guide means 56 supporting the cross slide 58 is displaceable in Z direction together with the longitudinal guide element 42 so that, as a result, a displacement of the tool 32 in Z direction is also possible.

This displacement can be brought about either by a defined positioning of the longitudinal guide element 42 in Z direction and fixing of this position relative to the slide upright 54 or controlled by a longitudinal feed motor 70 which is activated by the machine control 39, is arranged on a side of the slide upright 54 facing away from the working area 18 and drives a longitudinal feed gear 72.

The longitudinal feed gear 72 is arranged next to the longitudinal slide element 42 and between the bearing brackets 50 and 52 and comprises a threaded feed spindle 74 which extends parallel to the housing tube 44 of the longitudinal slide element 42 and is rotatable on the slide upright 54 by means of an axial bearing 76 seated on the bearing bracket 50 but is mounted so as to be non-displaceable along its axis 78.

Figure 4:
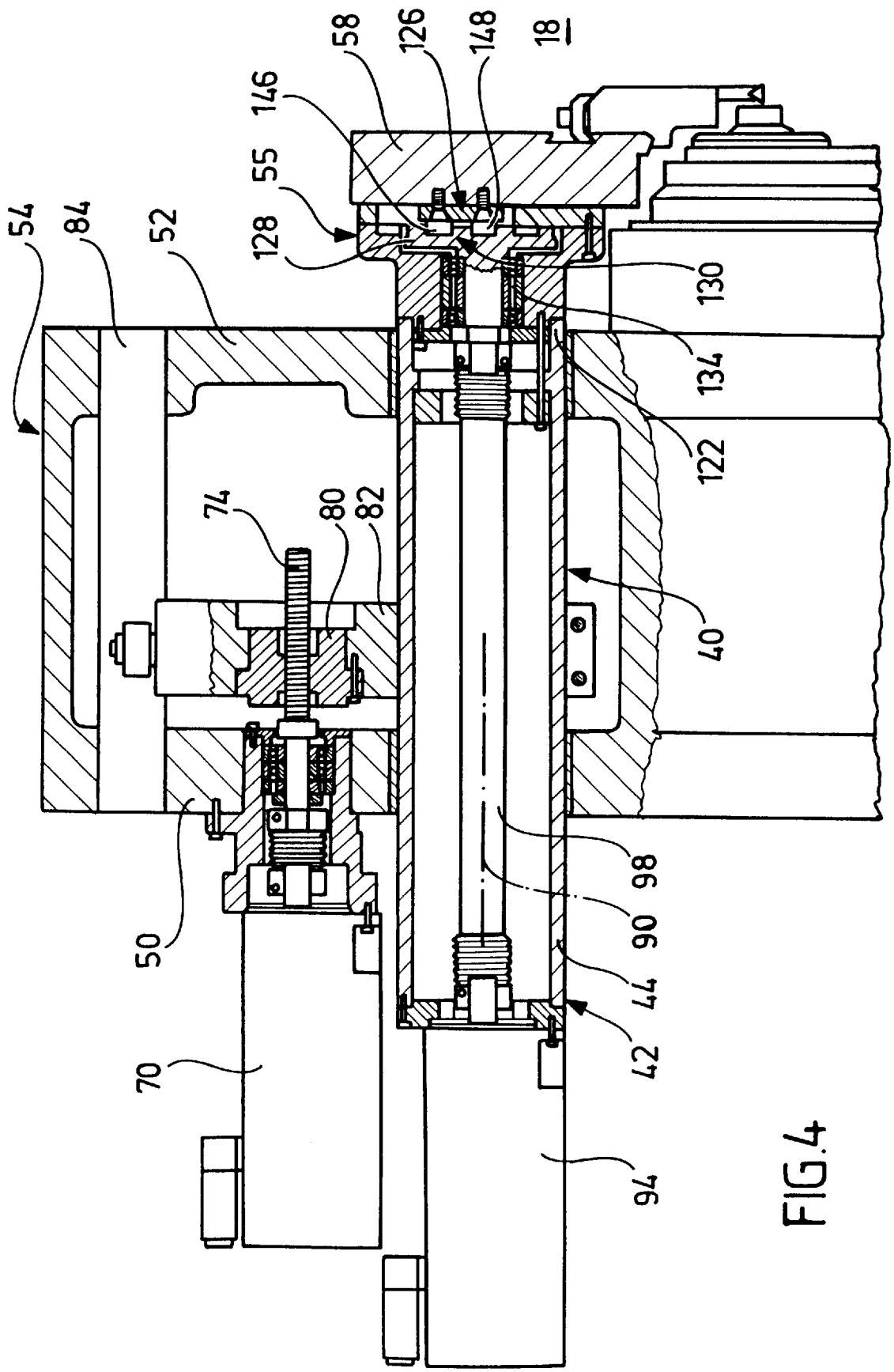
FIG. 4 shows a section similar to FIG. 3 through a variation of the tool slide illustrated in FIG. 3.

With the threaded feed spindle 74, a spindle nut 80 penetrated by it is displaceable in Z direction. The spindle nut 80 is thereby seated, as illustrated in FIGS. 3 and 4, in a supporting arm 82 which engages clampingly around the housing tube 44 of the longitudinal slide element 42 and extends transversely to it and accommodates the spindle nut 80 in a receiving means. The supporting arm 82 extends, in addition, from the housing tube 44 beyond the spindle nut 80 as far as a guide rod 84 which extends parallel to the Z direction between the bearing brackets 50 and 52 and is thus held securely on the slide upright 54. The supporting arm 82 slides with guide elements, preferably guide rollers 86 and 88 abutting on both sides of the guide rod 84, on the same. The guide rod 84 and the guide rollers 86 and 88 represent together with the supporting arm 82 a means for securing the longitudinal slide element 42 against rotations about its longitudinal axis 90.

As a result of rotation of the threaded feed spindle 74 and the displacement of the spindle nut 80 in Z direction connected therewith a movement of the longitudinal slide element 42 in Z direction, controllable by the machine control 39, is thus possible.

For driving the cross slide 58, a transverse feed motor 94 is, as likewise illustrated in FIG. 3, arranged at one end 92 of the longitudinal slide element 42 facing away from the working area 18. The motor shaft 96 of this motor extends parallel to the longitudinal axis 90 of the longitudinal slide element 42 and is preferably arranged coaxially to the axis 90. The transverse feed motor 94 drives a drive shaft 98 which passes through an inner cavity 100 of the housing tube 44 of the longitudinal slide element 42 approximately coaxially to the longitudinal axis 90 and is preferably provided with two Joints 102 and 104 arranged at a distance from one another and stiff against torsion.

The drive shaft 98 drives a miter gear which is designated as a whole as 106 and, for its part, drives a cross-feed threaded spindle 108 which is arranged in the cross-slide guide means 56 and is mounted at its end in the cross-slide guide means 56 so as to be rotatable and non-displaceable along its spindle axis 110. The cross-feed threaded spindle 108 thereby passes through, for its part, a spindle nut 112 which forms a cross-feed gear 111 with the cross-feed threaded spindle 108. The spindle nut 112 is securely connected to the cross slide 58 via a spindle nut holder 114 so that the cross slide 58 can be controlled in accordance with the displacement of the spindle nut 112 in X direction by the machine control 39, which activates the cross-feed motor 94, as a result of rotation of the cross-feed threaded spindle 108 via the miter gear 106 as well as via the drive shaft 98 by means of the cross-feed motor 94. The cross-feed motor 94 thus drives, via the drive shaft 98, a cross-feed gear, which is designated as a whole as 116, comprises the miter gear 106 and is, for example, arranged as a bevel gearing, and the cross-feed spindle 108 mounted at the respective end with the spindle nut 112 seated on it.

A connection of the cross-slide guide means 56 with the housing tube 44 of the longitudinal guide element 42 is brought about preferably by means of an annular flange 120 which projects radially inwards in an end 122 of the housing tube 44 facing the working area 18 and is penetrated by anchoring elements 124, for example, screws which are likewise anchored in the cross-slide guide means 56 and thus fix the cross-slide guide means 56 in position on the end 122 of the housing tube 44.

In a variation of the tool slide 40, illustrated in FIG. 4, those parts which are identical to those of the first embodiment are given the same reference numerals.

In contrast to the first embodiment, a cross-feed gear 126 is provided which is driven by the drive shaft 98 and has a lifting cam 128 which is driven by the drive shaft 98 and has a cam follower 130 with two cam follower elements 146, 148 which are securely connected to the cross slide 58.

Figure 5:
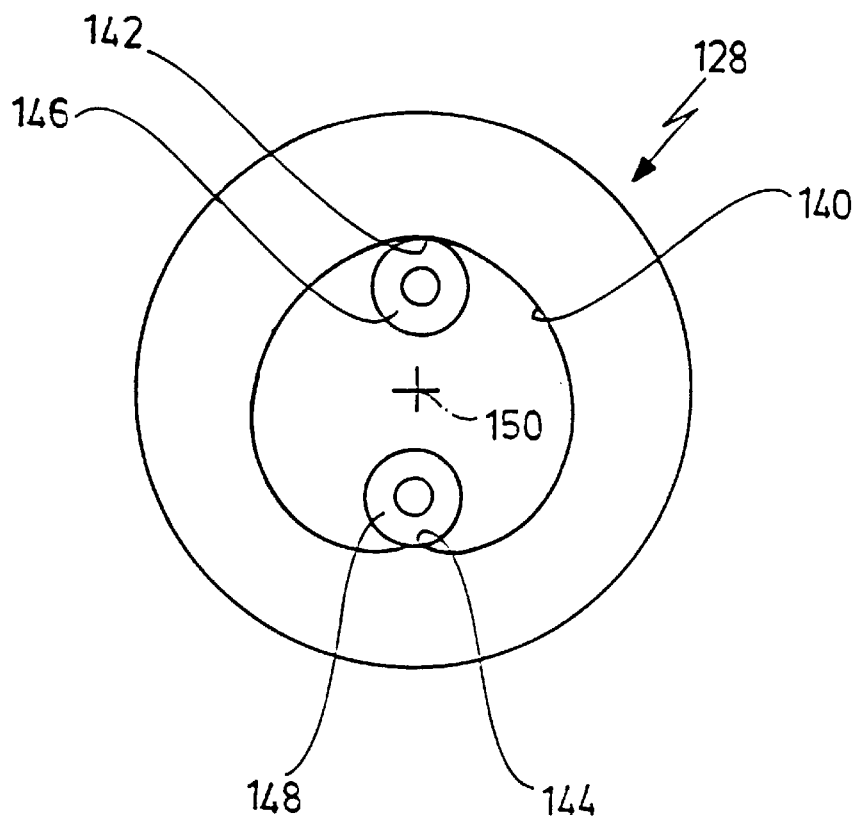
FIG. 5 shows a schematic illustration of a first variation of a lifting cam.
Figure 6:
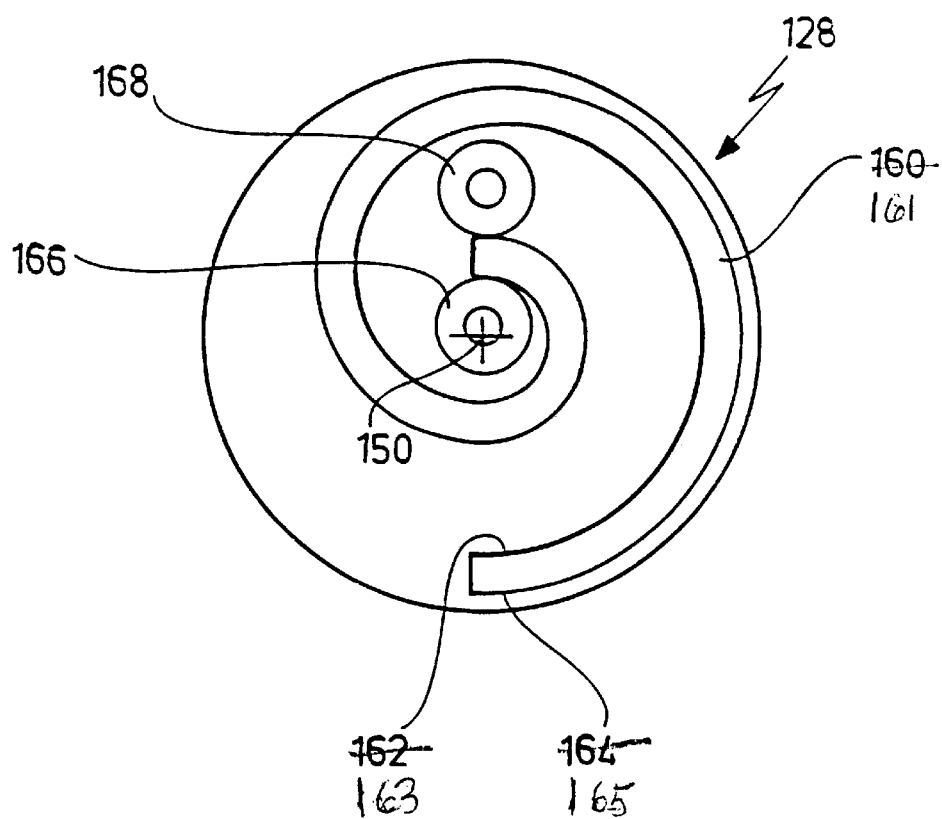
FIG. 6 shows a schematic illustration of a second variation of a lifting cam.

The lifting cam 128 is thereby mounted on the end 122 of the housing tube 44 of the longitudinal guide element 42 facing the working area 18 for rotation by means of a rotary bearing 134 and, as illustrated in FIGS. 5 and 6, is designed either as a hollow cam with an inner lifting surface 140 which acts with lifting surface areas 142 and 144 located respectively opposite one another on two cam follower members 146 and 148, for example, designed as rollers and thus clearly predetermines their position in X direction in accordance with the rotary position of the lifting cam 128. For this purpose, the lifting surface 140 is preferably designed such that the lifting surface areas 142, 144 located opposite one another always have the same distance from one another but thereby position the cam follower elements 146 and 148 at different radial distances in relation to an axis of rotation 150 of the lifting cam 128.

In a second embodiment of the lifting cam 128, the lifting cam 128 itself is designed as a bead 161 shaped like a spiral and has two lifting surfaces 163 and 165 which are located opposite one another and on which two cam follower elements 166 and 168, respectively, always abut. By rotating the spiral-shaped lifting cam 161 about the axis of rotation 150, a positioning of the cam follower elements 166 and 168 at a different radial distance from the axis of rotation 150 is thus possible, wherein the cam follower elements 166 and 168 connected to the cross slide 58 clearly position the cross slide 58 in X direction.

In the case of the tool slides 40 described thus far which are arranged on the side of the working area 18, on which the spindle drum 12 is also arranged, these are predominantly tool slides 40 for the controlled movement of tools 32 for machining the exterior.

Figure 7:
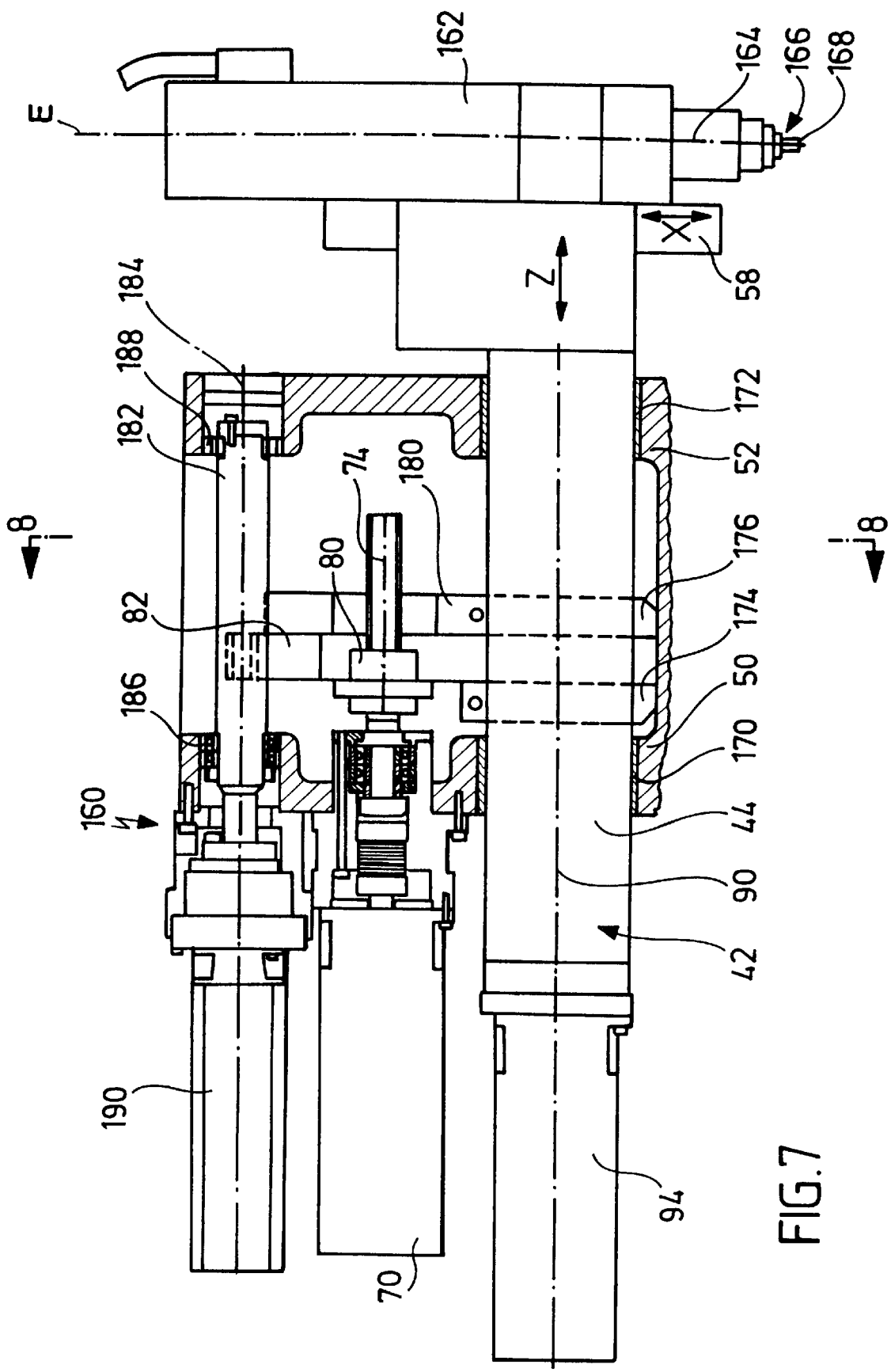
FIG. 7 shows a section similar to FIG. 3 through a tool slide with a rotatingly driven tool for the machining of a workpiece with a simulated Y-axis.
Figure 8:
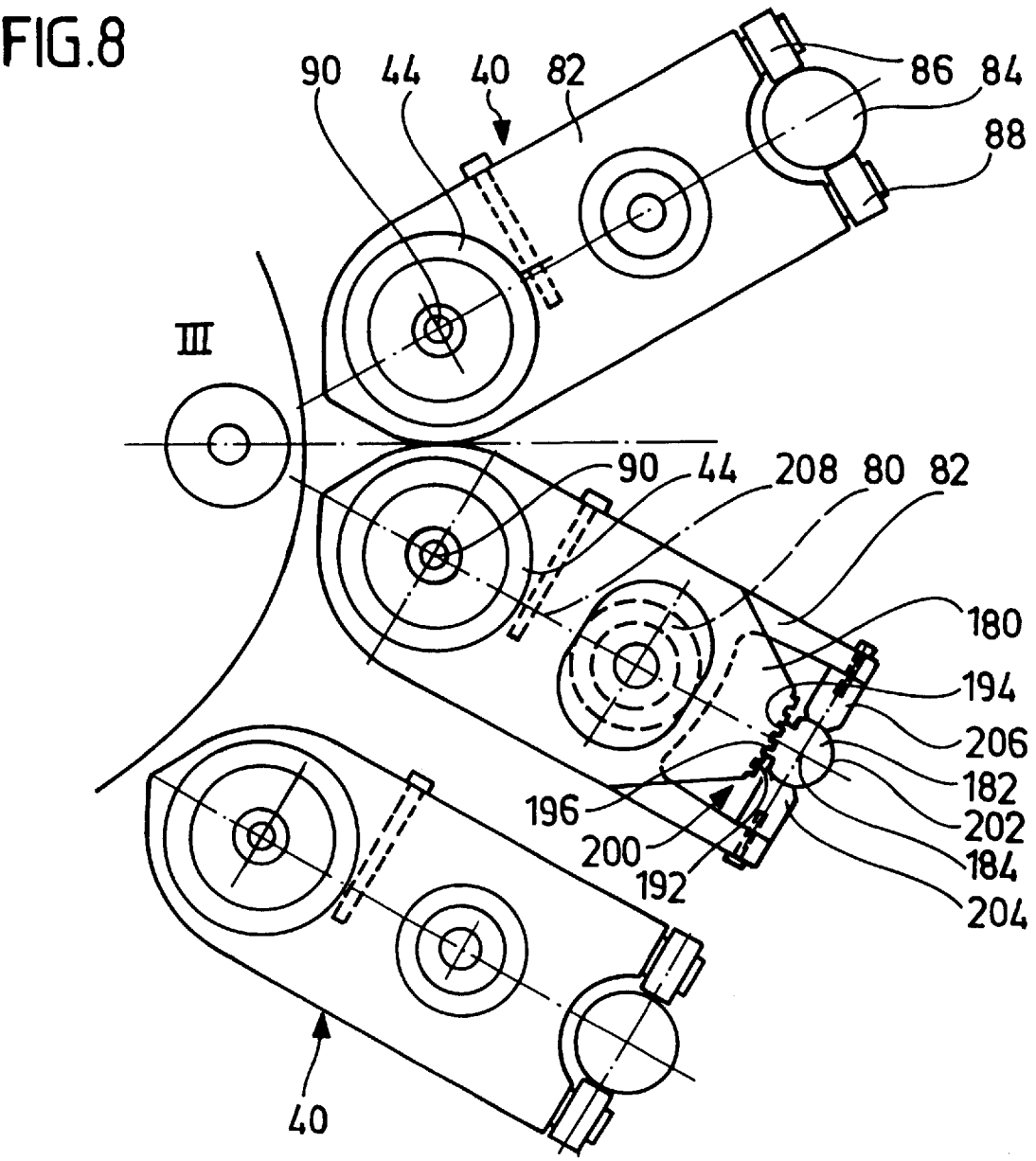
FIG. 8 shows a section along line 8—8 in FIG. 7 in the area of spindle station III.

In the case of a tool slide designated as a whole as 160 (FIG. 7), the cross slide 58 can be driven in the same way as with the tool slides 40 but the cross slide 58 movable in X direction supports a tool spindle which is designated as a whole as 162 and in which a rotating tool 166, for example, a milling tool is arranged and is drivable for rotation about a tool spindle axis 164.

With respect to the design of the cross-feed motor 94 for the cross slide 58 and the drive for the cross slide 58, reference is made to the comments on the preceding embodiments. In contrast to the tool slide 40, the housing tube 44 of the longitudinal slide element 42 is not held in the Z-guide means 46 and 48 but in guide means 170 and 172 which are arranged in the bearing brackets 50 and 52 and allow not only a displacement of the housing tube 44 in Z direction but also a rotation of the housing tube 44 about the longitudinal axis 90 thereof. In order to displace the longitudinal slide element 42 in the Z direction, the supporting arm 82 is rotatable about the longitudinal axis 90 of the housing tube 44 but is mounted on this so as to be non-displaceable in Z direction, for example, between two bearing parts 174 and 176 secured on the housing tube 44. The spindle nut 80, which can be driven in the same way as with the preceding tool slides 40 by the longitudinal feed motor 70, is arranged, in addition, in the supporting arm 82.

For the defined pivoting of the longitudinal slide element 42, the bearing part 176 is, for example, provided with a pivot drive arm 180 which extends away from the housing tube 44 as far as a toothed shaft 182 which is rotatable about a shaft axis 184 which extends parallel to the longitudinal axis 90, wherein the toothed shaft 182 is preferably arranged on a side of the threaded feed spindle 74 located opposite the longitudinal slide element 42.

The toothed shaft 182 is, for its part, mounted in the bearing brackets 50 and 52 for rotation by means of rotary bearings 186 and 188 and can be driven by a pivot drive motor 190 which is arranged on a side of the slide upright 54 located opposite the working area 18 and is, for its part, held on the bearing bracket 50.

The toothed shaft 182 preferably has teeth 196 only in a circumferential area 194 facing teeth 192 of the pivot drive arm 180 on its circumference, the teeth 196 capable of being brought into engagement with the teeth 192 of the pivot drive arm. The toothed shaft 182 preferably forms with the pivot drive arm 180 a pivot gear which is designated as a whole as 200 and is preferably designed to have little play, even better to be free from play, and with which the pivot drive motor 190 is in a position to pivot the longitudinal slide element 42 about its longitudinal axis 90 in a predetermined angular range.

The toothed shaft 182 forms, in addition, with its toothless circumferential areas 202 a guide surface for guide members 204 and 206 which are arranged on the supporting arm 82 and correspond with respect to their function to that of the guide rollers 86 and 88 so that the supporting arm 82 is always movable in the Z direction with its central axis 208, which preferably extends through the longitudinal axis 90 and through the axis 184, in the same alignment relative to the machine frame 10 and thus represents a non-rotatable receiving means for the spindle nut 80 for the play-free transfer of the Z movement of the spindle nut 80 to the longitudinal slide element in order to ensure a precise positioning of the longitudinal slide element 42 in the Z direction.

Figure 9:
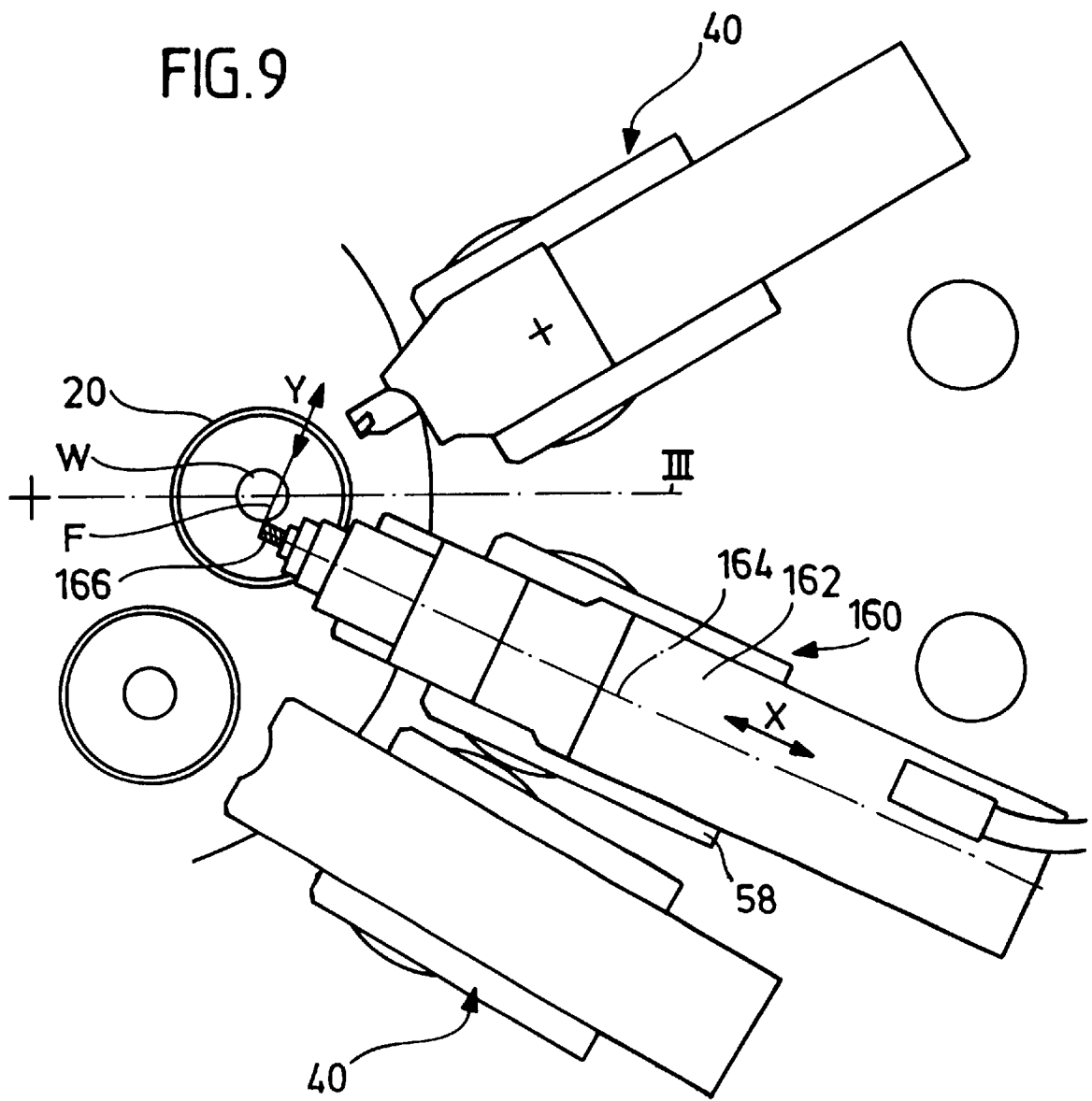
FIG. 9 shows a detailed, enlarged plan view of spindle station III with a tool slide equipped with a tool spindle and milling work with a simulated Y-axis commencing.
Figure 10:
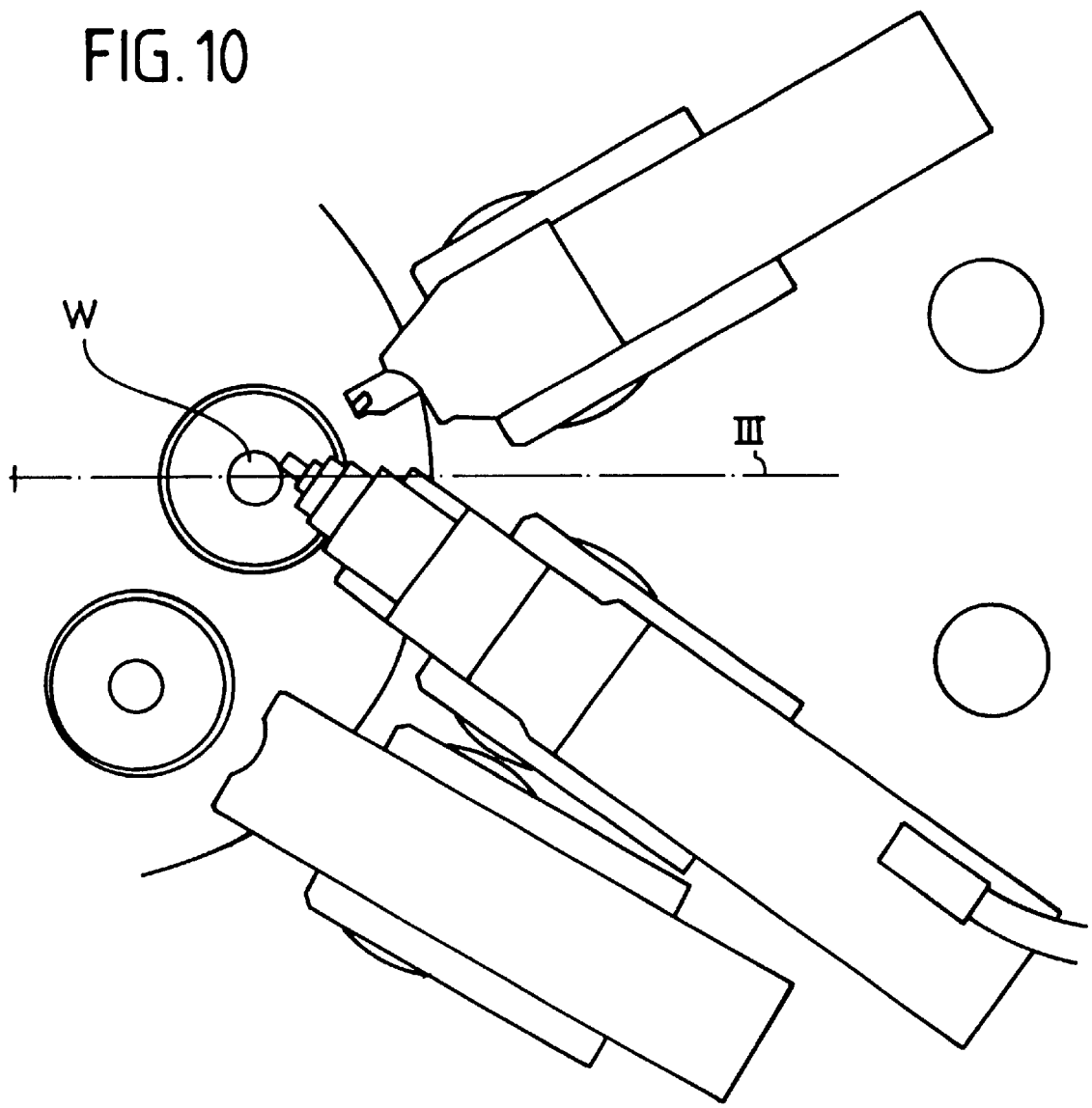
FIG. 10 shows a plan view similar to FIG. 9 with milling work with a simulated Y-axis finished.

Moreover, as a result of the pivot gear 200 the pivot drive arm 180 and, with it, the longitudinal slide element 42 as well is pivotable about the longitudinal axis 90 as pivot axis in addition to the movability in Z direction so that, as illustrated in FIGS. 9 and 10, it is possible to machine a workpiece W in such a manner that the rotating tool 166 is movable in a Y direction which extends at right angles to the X-axis and is arranged so as to be stationary relative to the workpiece W and, for example, a plane surface F can be generated on the workpiece W due to milling with the rotating tool 166.

Figure 11:
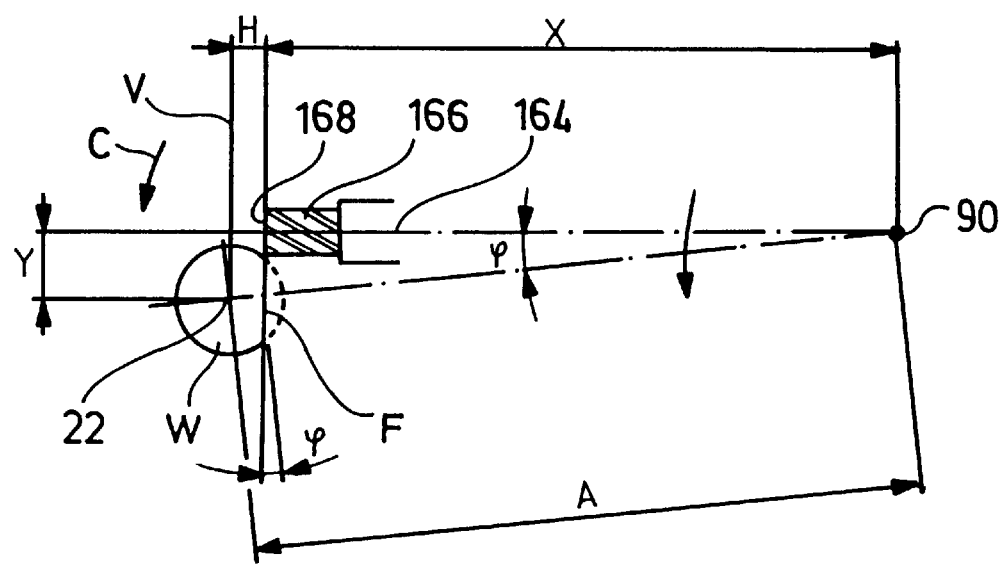
FIG. 11 shows a schematically simplified illustration of the geometrical ratios during off-center milling with a simulated Y-axis and FIG. 12 shows a schematically simplified illustration of the geometrical ratios similar to FIG. 11 during off-center boring with a simulated Y-axis.
Figure 12:
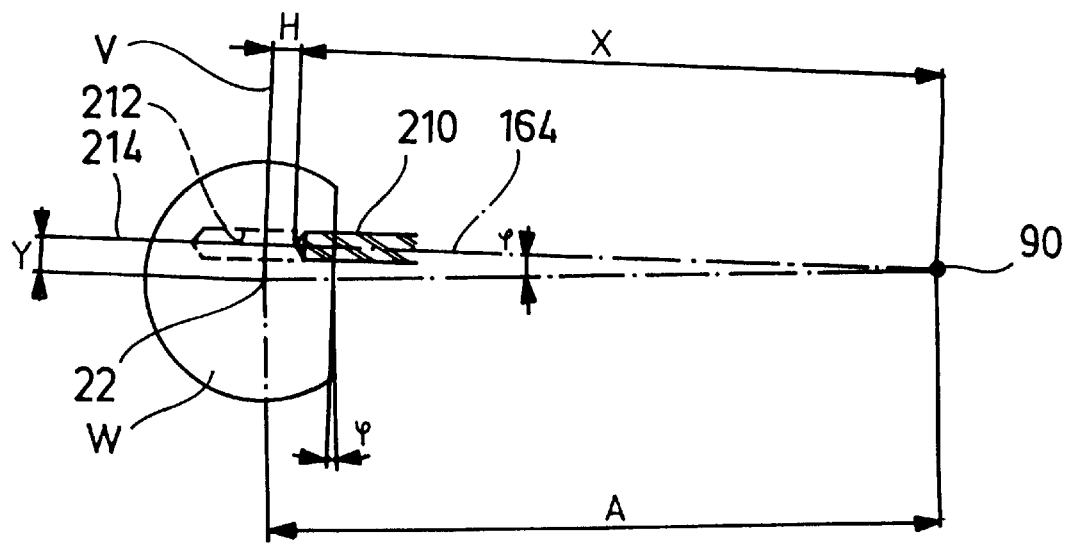

For this purpose, as illustrated in FIG. 11, a virtual plane V is defined which extends through the workpiece spindle axis 22 and in which the Y direction of the simulated Y-axis extending at right angles to the workpiece spindle axis 22 is located. Furthermore, the tool spindle axis 164 is aligned, for example, such that it is always located on the virtual plane V stationarily defined with respect to the workpiece W.

Milling of a plane surface F parallel to the virtual plane V is now brought about in a Y-axis simulation mode of the machine control 39 in such a manner that, as illustrated in FIG. 11, the machine control 39 pivots the workpiece W about the workpiece spindle axis 22 on account of the numerically controllable C-axis and at the same time the tool spindle axis 164 due to pivoting of the cross slide 58 about the axis 90 with the same direction of rotation, wherein on account of the pivoting of the workpiece W about the C-axis the virtual plane V is likewise pivoted with the workpiece W. In this respect, the machine control 39 has to meet the condition that the tool spindle axis 164 is always at right angles to the virtual plane V. In the case of the plane surface F, the cross slide 58 is, in addition, to be moved in X direction such that despite rotation of the workpiece W and thus also of the virtual plane V by means of the C-axis the distance of an end face 168 of the milling tool 166 from the virtual plane V remains constant.

During the entire pivoting movement of the tool spindle axis 164 about the pivot axis 90 the tool spindle axis 164 moves in a plane E which coincides with the plane of drawing in the illustration of FIG. 11 and which extends at right angles to the pivot axis 90 and at right angles to the workpiece spindle axis 22.

For the special case where the tool spindle axis 164 is arranged radially to the pivot axis 90 the equation $$H+X=\sqrt{A^2-Y^2}$$

results for the machining of the plane surface F on the basis of the Pythagorean equations, wherein H is the distance of the surface F from the virtual plane V, A represents the distance of the workpiece spindle axis 22 from the pivot axis 90 determined by the machine upright 10 of the machine tool and X the distance of the end face 168 of the milling tool 166 from the pivot axis 90. The angles $\phi$ are, in this case, likewise of equal size and are varied in the same way, wherein the angle $\phi$ results from the equation:

$$sinus\, \varphi = \frac{Y}{A}.$$

Variations of the described procedure are, however, conceivable for the milling of plane surfaces.

First of all, it is possible to arrange the tool spindle axis 164 so as to be displaced parallel to the X-axis.

A further possibility is for the tool spindle axis 164 not to extend parallel to the X-axis but at an angle to it, wherein the angle can be located in the X-Z plane and/or in the X-Y plane. In the extreme case, the tool spindle axis 164 extends in a skewed manner in relation the X-axis.

Instead of providing a milling tool 166, it is also possible to insert a boring tool 210, with which a bore 212 located off-center is intended to be introduced into the workpiece W, wherein the bore 212 is intended to be located with its central axis 214 off-center and offset by the value Y in the direction of the simulated virtual Y-axis in relation to the workpiece spindle axis 22.

In this case, the workpiece W is rotated by means of the C-axis in such a manner that the tool spindle axis 164 is at right angles to the virtual plane V and intersects this at a point at a distance Y from the workpiece spindle axis 22.

If the tool spindle axis 164 extends in a radial direction of the pivot axis 90, it is now possible due to an exclusive feed movement in X direction to introduce the bore 212 into the workpiece W off-center, wherein the pivoting about the pivot axis 90 and the rotation of the workpiece W about the C-axis is required merely for the initial specification of the angle φ and the angle φ results from the equation $$sinus\, \varphi = \frac{Y}{A},$$

i.e. the distance of the axis 214 of the bore 212 from the workpiece spindle axis 22 can be determined by the angle φ and remains determined during the entire machining of the bore.

The same modifications as those described in conjunction with the milling tool are also conceivable in the case of the boring tool 210 in addition to the special alignment described above of the individual X, Y and Z directions in relation to the workpiece spindle axis 22 and the tool spindle axis 164.

What is claimed is:

1. Machine tool comprising
    a machine frame,
    at least one workpiece spindle,
    a workpiece being clampable in said spindle and drivable for rotation about a workpiece spindle axis, said workpiece held in the workpiece spindle and being rotatable about the workpiece spindle axis into defined rotary positions by means of a numerically controlled C-axis,
    a support, the workpiece spindle being arranged on said support and the workpiece spindle being movable with said support relative to the machine frame and transversely to the workpiece spindle axis into at least two spindle stations stationarily arranged with respect to the machine frame,
    at least one tool carrier associated with a selected one of the spindle stations, comprising a transverse-slide carrier mounted on the machine frame and having a transverse slide for a tool, said transverse slide being movable in a linear direction and in a controlled manner with respect to said transverse slide carrier so as to move the tool in an X direction relative to the workpiece spindle located in the selected spindle station, said transverse-slide carrier being pivotable in relation to the machine frame about a pivot axis extending parallel to the workpiece spindle axis of the workpiece spindle located in the selected spindle station by means of a pivot drive in a numerically controlled manner,
    a tool spindle provided on the transverse slide for receiving a tool drivable for rotation about a tool spindle axis, said tool spindle axis forming with the X direction an angle of less than 45°.

2. Machine tool as defined in claim 1, wherein the tool spindle axis extends in all positions of the transverse slide in a plane extending at right angles to the workpiece spindle axis of the workpiece spindle located in the selected spindle station.

3. Machine tool as defined in claim 1, wherein a machine control is provided for moving the workpiece in a Y-axis simulation mode about the workpiece spindle axis and the transverse-slide carrier about the pivot axis simultaneously in such a manner that in all the off-center positions of the tool spindle axis provided for the off-center machining of the workpiece by the driven tool this axis always extends at right angles to a virtual Y-axis arranged so as to be stationary relative to the workpiece and located in a virtual plane extending through the workpiece spindle axis.

4. Machine tool as defined in claim 3, wherein in the Y-axis simulation mode the machine control controls the X-axis in addition to the C-axis and to the pivot axis in such a manner that a cutting edge of the rotatingly driven tool always moves at a constant distance from the virtual plane in all the off-center positions of the tool spindle axis.

5. Machine tool as defined in claim 3, wherein in the Y-axis simulation mode in a specific off-center position of the tool spindle axis the machine control maintains a Y-value corresponding to this position and while this position is being maintained moves the tool linearly at right angles to the virtual plane at least during control of the X-axis.

6. Machine tool as defined in claim 1, wherein the tool spindle axis extends parallel to the X-axis.

7. Machine tool as defined in claim 1, wherein the transverse-slide carrier is rotatable about a pivot bearing securely arranged on the machine frame and determining the pivot axis.

8. Machine tool as defined in claim 1, wherein the transverse-slide carrier is connected to a pivot drive arm extending radially to the pivot axis, the pivot drive acting on said arm.

9. Machine tool as defined in claim 1, wherein the pivot drive acts on the transverse-slide carrier via a turning gear.

10. Machine tool as defined in claim 9, wherein the turning gear is designed to have little play.

11. Machine tool as defined in claim 10, wherein the turning gear is designed to be essentially free from play.

12. Machine tool as defined in claim 9, wherein the turning gear comprises a toothed element rotatable about an axis parallel to the pivot axis, said element acting on teeth of the pivot drive arm.

13. Machine tool as defined in claim 1, wherein the transverse-slide carrier is displaceable in Z direction relative to the machine frame.

14. Machine tool as defined in claim 13, wherein the transverse-slide carrier is mounted on the machine frame by means of a longitudinal guide element displaceable in the Z direction relative to the machine frame.

15. Machine tool as defined in claim 14, wherein the longitudinal guide element is designed as a guide arm extending in the Z direction.

16. Machine tool as defined in claim 15, wherein the guide arm passes through an upright on the machine frame mounting a spindle carrier.

17. Machine tool as defined in claim 15, wherein the guide arm is mounted in Z-guide means held on the machine frame so as to be movable in the Z direction relative to the machine frame.

18. Machine tool as defined in claim 1, wherein a pivot bearing for the transverse-slide carrier supports the guide arm.

19. Machine tool as defined in claim 18, wherein the pivot bearing also forms the Z-guide means for the guide arm.

20. Machine tool as defined in claim 18, wherein the guide arm is designed as a spindle sleeve member mounted in the pivot bearing for displacement in Z direction.

21. Machine tool as defined in claim 8, wherein the pivot drive arm is non-rotatably connected to the guide arm.

22. Machine tool as defined in claim 21, wherein the pivot drive arm is rigidly connected to the guide arm.

23. Machine tool as defined in claim 12, wherein the pivot drive arm is movable relative to the toothed element in the direction parallel to the pivot axis.

24. Machine tool as defined in claim 23, wherein the toothed element extends in the direction of the pivot axis with a length corresponding to a maximum path of displacement of the transverse-slide carrier in Z direction.

25. Machine tool as defined in claim 1, wherein the transverse-slide carrier is provided with a transverse feed drive for the controlled movement of the transverse slide in the X direction.

26. Machine tool as defined in claim 25, wherein the transverse feed drive is arranged on a side of the longitudinal guide element located opposite the transverse slide.

27. Machine tool as defined in claim 13, wherein a longitudinal feed drive for the movement of the transverse slide carrier is arranged on the machine frame.

28. Machine tool as defined in claim 27, wherein the longitudinal feed drive acts on a supporting arm extending transversely to the longitudinal guide element, said arm being connected to the longitudinal guide element so as to be non-displaceable in the Z direction.

29. Machine tool as defined in claim 28, wherein the supporting arm is held on the longitudinal guide element so as to be pivotable about the pivot axis.

30. Machine tool as defined in claim 29, wherein the supporting arm is secured against any tilting about the pivot axis by a tilt support extending parallel to the direction of the pivot axis.

31. Machine tool as defined in claim 30, wherein the toothed element forms the tilt support for the supporting arm.

32. Machine tool as defined in claim 31, wherein the supporting arm is guided on the toothed element for displacement parallel to the direction of the pivot axis.

33. Method for operating a machine tool having a machine frame and at least one workpiece spindle, comprising the steps of:

clamping a workpiece in said spindle and rotating said workpiece about a workpiece spindle axis, said workpiece held in the workpiece spindle and being moved about the workpiece spindle axis into defined rotary positions by means of a numerically controlled C-axis, arranging the workpiece spindle on a support, said workpiece spindle being movable with said support relative to the machine frame and transversely to the workpiece spindle axis into at least two spindle stations stationarily arranged with respect to the machine frame, wherein:

at least one tool carrier is associated with a selected spindle station, said tool carrier comprising a transverse-slide carrier mounted on the machine frame and having a transverse slide for a tool, said transverse slide being movable in a linear direction and in a controlled manner with respect to said transverse-slide carrier so as to move the tool in an X direction in relation to the workpiece spindle located in the selected spindle station, said transverse-slide carrier is moved in relation to the machine frame about a pivot axis extending parallel to the workpiece spindle axis of the workpiece spindle located in the selected spindle station by means of a pivot drive in a numerically controlled manner, a tool spindle for receiving a tool driven for rotation about a tool spindle axis is provided on the transverse slide, the tool spindle axis forming with the X direction an angle of less than 45°.

34. Method as defined in claim 33, wherein the tool spindle axis is moved in a plane extending at right angles to the workpiece spindle axis of the workpiece spindle located in the selected spindle station due to the movement of the transverse slide in the X direction and about the pivot axis.

35. Method as defined in claim 33, wherein in a Y-axis simulation mode the workpiece is moved about the workpiece spindle axis and the transverse-slide carrier about the pivot axis simultaneously in such a manner that in all the off-center positions of the tool spindle axis provided for the off-center machining of the workpiece by the driven tool this axis always extends at right angles to a virtual Y-axis arranged so as to be stationary relative to the workpiece and located in a virtual plane extending through the workpiece spindle axis, said Y-axis being turned due to turning of the workpiece about the workpiece spindle axis.

36. Method as defined in claim 35, wherein in the Y-axis simulation mode the tool is moved in the X-axis in additional to the C-axis and to the pivot axis in such a manner that a cutting edge of the rotatingly driven tool always moves at a constant distance from the virtual plane in all the center and off-center positions of the tool spindle axis.

37. Method as defined in claim 35, wherein in the Y-axis simulation mode in a specific off-center position of the tool spindle axis the Y-value of the simulated Y-axis determining this position is maintained and while this position is being maintained the tool is moved linearly through the X-axis and, where applicable, through the C-axis and the pivot axis at right angles to the virtual plane.

* * * * *